(12) United States Patent
Purvis

(10) Patent No.: US 8,978,619 B1
(45) Date of Patent: Mar. 17, 2015

(54) PISTONLESS ROTARY ENGINE WITH MULTI-VANE COMPRESSOR AND COMBUSTION DISK

(71) Applicant: Arlen Dennis Purvis, Eugene, OR (US)

(72) Inventor: Arlen Dennis Purvis, Eugene, OR (US)

(*) Notice: Subject to any disclaimer, the term of this patent is extended or adjusted under 35 U.S.C. 154(b) by 0 days.

(21) Appl. No.: 13/940,858

(22) Filed: Jul. 12, 2013

Related U.S. Application Data

(63) Continuation-in-part of application No. 13/871,906, filed on Apr. 26, 2013, now abandoned.

(60) Provisional application No. 61/638,899, filed on Apr. 26, 2012.

(51) Int. Cl.
*F02B 53/04* (2006.01)
*F02B 53/00* (2006.01)
*F02B 53/10* (2006.01)
*F01B 3/00* (2006.01)

(52) U.S. Cl.
CPC .................. *F02B 53/00* (2013.01); *F02B 53/04* (2013.01); *F02B 53/10* (2013.01); *F01B 3/0094* (2013.01); *Y02T 10/17* (2013.01)
USPC ............. 123/218; 123/241; 123/245; 418/36; 418/217

(58) Field of Classification Search
CPC .......... F02B 53/00; F02B 53/04; F02B 53/10; F02B 37/10; F02B 37/105; F02B 37/14; F02B 39/02; F02B 39/04; F02B 39/06; F02B 39/12; F02B 3/06; F01B 3/0094; Y02T 10/17; Y02T 10/144; F16H 61/0293; F02D 41/0007
USPC .......... 123/143 R, 144 A, 218, 228, 230, 241, 123/245; 418/36, 61.1, 160, 161, 209, 217, 418/607–609; 475/267; 310/74, 112; 74/572.1; 60/39.6, 39.62, 39.63
See application file for complete search history.

(56) References Cited

U.S. PATENT DOCUMENTS

| | | | | |
|---|---|---|---|---|
| 1,362,400 A * | 12/1920 | Deubel | ................. | 123/227 |
| 3,367,240 A * | 2/1968 | Keppler | ................ | 91/480 |
| 3,562,567 A * | 2/1971 | Carini | .................. | 310/83 |
| 4,031,420 A * | 6/1977 | Carini | .................. | 310/74 |
| 4,539,941 A * | 9/1985 | Wang | ................ | 123/18 R |
| 8,240,231 B2 * | 8/2012 | Kwok | ................ | 74/572.1 |
| 8,633,625 B2 * | 1/2014 | Palazzolo et al. | ........... | 310/90.5 |
| 2010/0117375 A1 * | 5/2010 | Kwok | ................ | 290/1 R |

FOREIGN PATENT DOCUMENTS

JP 59005832 A * 1/1984 ............ F02B 37/10

OTHER PUBLICATIONS

Translation of abstract, JP 59005832 A, May 7, 2014.*

* cited by examiner

*Primary Examiner* — Mary A Davis
*Assistant Examiner* — Jason T Newton

(57) ABSTRACT

Some embodiments provide a non-piston rotary engine that utilizes flywheel motion to generate power. In some embodiments, the non-piston rotary engine comprises a pair of flywheels and a plurality of rotor assemblies for generating mechanical energy. In some embodiments, each rotor assembly comprises a multi-vane compressor that rotates within a vane compressor housing. In some embodiments, each rotor assembly comprises a rotating combustion disk in a combustion housing. In some embodiments, the combustion housing comprises a plurality of combustion disk chambers for igniting the combustible gas and expelling exhaust fumes created after combustion, wherein combustible gas forced into each combustion disk chamber is combusted, causing the rotor to move in a direction to release exhaust from the combustion.

19 Claims, 7 Drawing Sheets

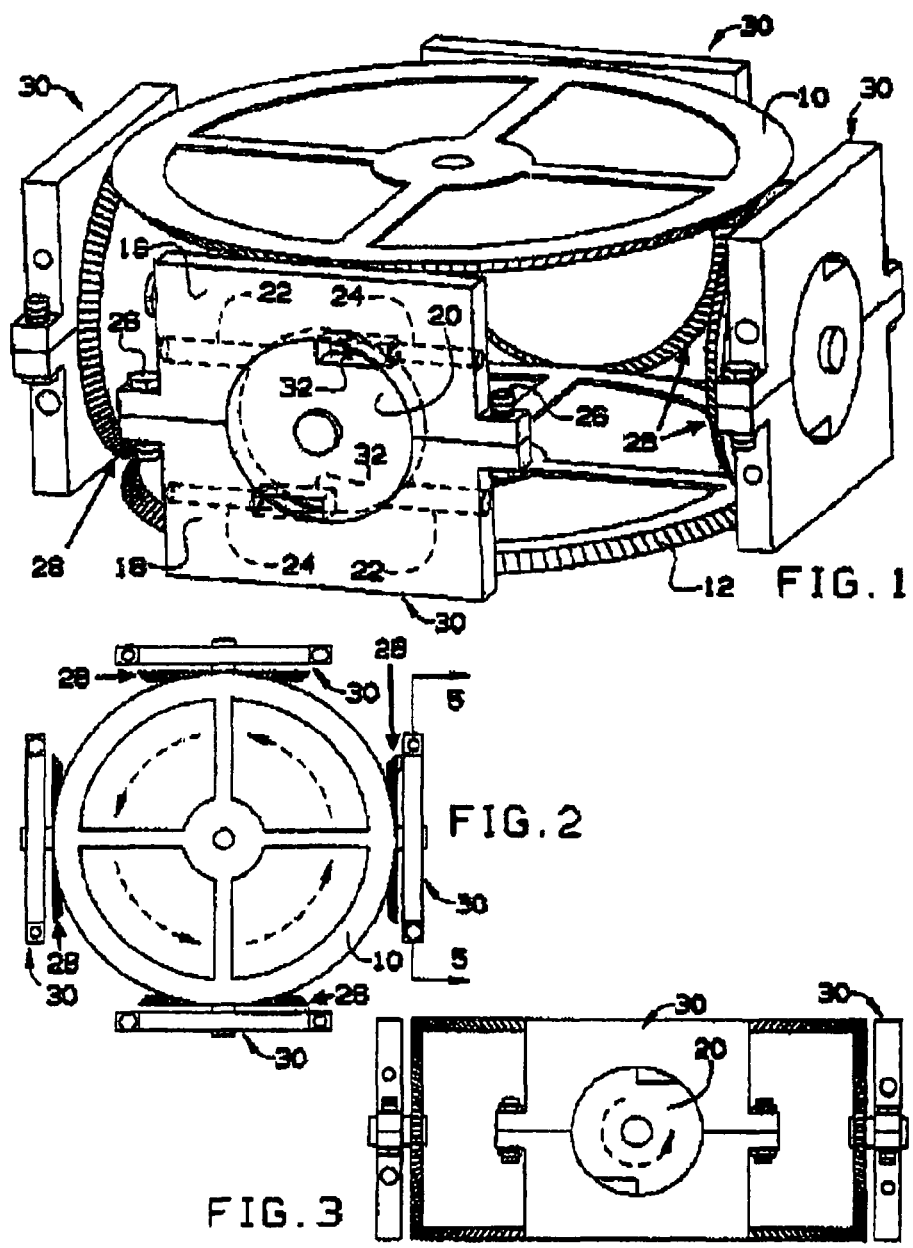

PISTONLESS ROTARY ENGINE WITH MULTI-VANE COMPRESSOR AND COMBUSTION DISK

CLAIM OF BENEFIT TO PRIOR APPLICATIONS

This application is a continuation-in-part application and claims the benefit of United States Non-Provisional patent application Ser. No. 13/871,906, entitled "Balanced Flywheel Rotary Engine," filed Apr. 26, 2013, which claims the benefit of U.S. Provisional Patent Application 61/638,899, entitled "Combustion Engine, all firing at exactly the same time producing more power and less resistance," filed Apr. 26, 2012. The United States Non-Provisional patent application Ser. No. 13/871,906 is incorporated herein by reference.

BACKGROUND

For well over 100 years, piston-based internal combustion engines have worked by firing the pistons one at a time to turn a flywheel that generates power. Specifically, power is generated by compression, ignition, and expansion strokes of the Otto-cycle. Such standard piston-based internal combustion engines have worked well to produce abundant power to operate vehicles and machinery. Although such standard piston engines work well to produce power, the pistons operate in a way those results in heavy maintenance due to the constant up and down pounding of the pistons. In addition, the pistons fight against each other when pounding up and down, resulting in restricted performance of the engine. In the end, standard piston engines require a high level of maintenance to keep the engine in working order. This is problematic for many consumers who purchase cars, trucks, and other vehicles with standard piston engines. Most consumers do not want or know how to repair or replace damaged and/or worn out pistons. Thus, in order to maintain the engine, most consumers end up paying an automobile mechanic a lot of money on engine upkeep. Even if a consumer knows how to repair and/or replace engine parts, such as pistons, the cost of replacement parts adds up quickly. Eventually, most consumers end up paying a considerable sum of money to maintain the engine.

Other engine designs exist, such as rotary engines, which do not use pistons to produce power. While the concept of pistonless rotary engines has been around for nearly a century, development of the technology has been slow moving with few designs ever reaching the production stage. In general, rotary engines to date have been daunted by a number of problems that limit their wide-spread general use in cars and trucks. The most widely known rotary engine is the Wankel engine, which is one of few rotary engines currently in production (e.g., by Mazda Motor Corp.). However, current rotary engines are plagued by exceedingly high fuel requirements needed to produce power, the environmental damage caused by the amount of pollution released into the air, and faulty components such as seals that know to leak after a short amount of routine use.

Thus, what is needed is a non-piston engine that efficiently generates power in a way that minimizes maintenance by providing balanced flywheel rotation and by reducing internal pressure on the engine due the elimination of pounding by pistons.

BRIEF SUMMARY

Some embodiments of the invention provide a novel non-piston rotary engine that utilizes flywheel motion to generate power. In some embodiments, the non-piston rotary engine comprises a flywheel and a combustion disk with two combustion chambers. In some embodiments, a compressor provides a compressed air-fuel mixture to the combustion chamber for ignition. In some embodiments, the compressor is attached to a drive shaft of the combustion disk for directly transmitting power from combustion disk to compressor. In some embodiments, an exhaust nozzle guides exhaust gases produced by combustion in a direction that creates a force on the combustion disk while rotating after ignition.

In some embodiments, the non-piston rotary engine comprises a pair of flywheels for generating power, a plurality of rimmed gears for applying rotary motion to the flywheels, a plurality of drive shafts that rotate the plurality of rimmed gears, and a plurality of rotor assemblies for generating mechanical energy to transfer to the rimmed gears. In some embodiments, the pair of flywheels comprises an upper flywheel and a lower flywheel. In some embodiments, the upper and lower flywheels rotate in opposite directions to balance the generated power. In some embodiments, each rimmed gear is connected to the upper and lower flywheels. In some embodiments, each rotor assembly comprises a plurality of adjustable partition vanes and a vane compressor disk that rotates within a vane compressor housing. In some embodiments, each rotor assembly further comprises a combustion disk and a plurality of combustion disk chambers for igniting combustible gas and expelling exhaust fumes created after combustion.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matters can be embodied in other specific forms without departing from the spirit of the subject matters.

BRIEF DESCRIPTION OF THE DRAWINGS

Having described the invention in general terms, reference is now made to the accompanying drawings, which are not necessarily drawn to scale, and wherein:

FIG. 1 conceptually illustrates a perspective view of an example balanced flywheel rotary engine of some embodiments.

FIG. 2 conceptually illustrates a top view of an example balanced flywheel rotary engine of some embodiments.

FIG. 3 conceptually illustrates a front view of an example balanced flywheel rotary engine of some embodiments.

DETAILED DESCRIPTION

Figure 4:
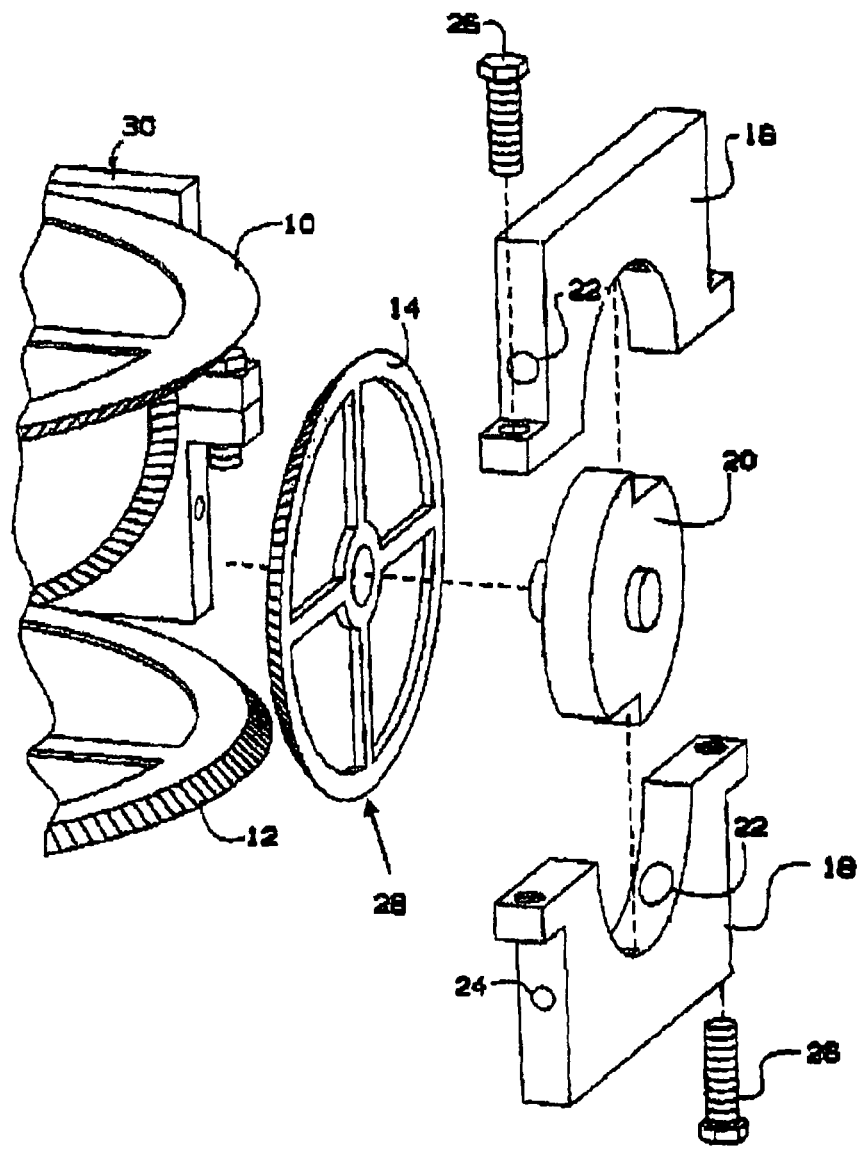
FIG. 4 conceptually illustrates an exploded view of an example balanced flywheel rotary engine of some embodiments.

In the following detailed description, several examples and embodiments of the invention are described. However, it will be clear to a person skilled in the art that the invention is not limited to the embodiments set forth and can be adapted for any of several other uses.

Some embodiments of the invention provide a novel non-piston rotary engine that utilizes flywheel motion to generate power. In some embodiments, the rotary engine comprises a rotating combustion disk for igniting a combustible mixture of air and gas and expelling exhaust after combustion. In some embodiments, the rotating combustion disk comprises a set of combustion chambers for receiving the combustible mixture of air and gas to be ignited and for expelling the exhaust after combustion. In some embodiments, the rotary engine rotors are designed for efficient power generation by the rotating combustion disk.

The use of such a combustion disk is different from the pistons that a standard reciprocating engine uses to achieve the compression, ignition, and expansion strokes of the Otto-cycle. Also, the combustion disk achieves greater efficiency than classic rotary engines. For instance, in many cases, classic rotary engines are not as efficient as piston engines due to the shape of the combustion chamber and the laws of thermodynamics. The Wankel design, in particular, consists of a 3-sided symmetric rotor that spins eccentrically within an epitrochoid-shaped housing, completing the four strokes of a typical Otto-cycle. In the Wankel engine, the combustion chamber is long and often supercharged, resulting in a low compression ratio, this combination results in a higher fuel consumption rate for the rotary engine. Most engines meter oil into the combustion chamber to help preserve the apex seals. However, this results in more oil being burnt during operation. Thus, such use results in higher running costs (i.e., more oil).

Therefore, due to less fuel efficiency and less reliability, the classic rotary engine has not taken off quite like expected amongst the car engine fanatics. Theoretically the rotary engine has the ability to far surpass the standard reciprocating piston internal combustion engine, but material and sealing issues have hindered the progression of the rotary engine into the mainstream.

In contrast to classic rotary engines, however, the pistonless rotary engine in some embodiments is highly efficient at producing power by using flywheel motion. In some embodiments, the efficient production of power involves the use of four rotary engines tied together through two opposing direction flywheels. The increase in efficiency over traditional engines is produced by continuous rotational inertia of the various fly wheels.

Several more detailed embodiments are described below. Section I describes embodiments of a pistonless rotary engine with a set of rotors, where each rotor is individually contained in a housing and in contact with flywheels, and each rotor performs a four stroke combustion cycle (i.e., intake, compression, ignition, and expansion strokes) within the housing. Section II describes embodiments of a pistonless rotary engine with a set of rotor assemblies, where each rotor assembly is spread over (i) a multi-vane compression housing, in which the rotor assembly performs the intake and compression strokes of the cycle, and (ii) a combustion housing, in which the rotor assembly performs the ignition and expansion strokes of the cycle.

I. Pistonless Rotary Engine with Encapsulated Rotors

Some embodiments of the invention provide a novel non-piston rotary engine that utilizes flywheel motion to generate power. In some embodiments, the non-piston rotary engine comprises a flywheel and a combustion disk with two combustion chambers. In some embodiments, a compressor provides a compressed air-fuel mixture to the combustion chamber for ignition. In some embodiments, the compressor is attached to a drive shaft of the combustion disk for directly transmitting power from combustion disk to compressor. In some embodiments, an exhaust nozzle guides exhaust gases produced by combustion in a direction that creates a force on the combustion disk while rotating after ignition.

FIG. 1 conceptually illustrates a perspective view of an example balanced flywheel rotary engine of some embodiments. Specifically, this figure shows a number of components of the balanced flywheel rotary engine, including an upper flywheel 10, a lower flywheel 12, a bevel gear 28, and a set of four single rotor assemblies 30. Each of the single rotor assemblies 30 includes an upper combustion bracket 16, a lower combustion bracket 18, a set of bolts 26 that connect the upper and lower combustion brackets, and a rotor 20. Each of the combustion brackets 16 and 18 includes an exhaust port 22, a combustion port 24, and a rotor combustion chamber 32. The exhaust ports 22, combustion ports 24, and rotor combustion chambers 32 are not actually visible from a perspective view of an actual balanced flywheel rotary engine, but are shown in this figure by dashed lines for illustrative purposes.

In some embodiments, the rotary assemblies 30 are individual motors that are positioned between the top and bottom flywheels 10 and 12. In some embodiments, the rotary motors all fire at the same time. When the rotary motors 30 are firing simultaneously, resulting combustion turns the upper flywheel 10 in one direction and the lower flywheel 12 in the opposite direction. The opposing direction the flywheels are moving in results in smooth centrifugal force that is perfectly balanced. Thus, because the flywheels and the rotary motors work in synch, the engine operates in a perfectly balance state in these embodiments.

FIG. 2 conceptually illustrates a top view of an example balanced flywheel rotary engine of some embodiments. This figure will be described by reference to FIGS. 5 and 6. As shown in FIG. 2, the upper flywheel 10 is rotating in a particular direction (shown by the dashed arrows). In some embodiments, each of the bevel gears 28 moves according to the movement of the rotor 20 of the corresponding rotary motor 30. As the bevel gears 28 rotate, the upper flywheel 10 is caused to rotate accordingly. Although not shown in FIG. 2, an opposite movement of the lower flywheel 12 is caused by rotation of the bevel gears 28 in some embodiments.

Figure 5:
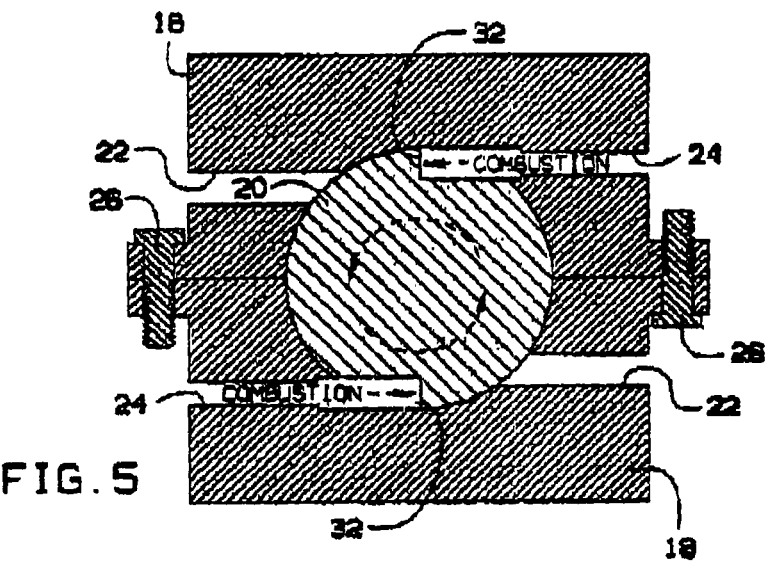
FIG. 5 conceptually illustrates a detailed sectional view of a single rotor assembly along line 5-5 of the rotary engine shown in FIG. 2 while the engine is in a combustion phase.

FIG. 5 conceptually illustrates a detailed sectional view of a single rotor assembly 30 along line 5-5 of the rotary engine shown in FIG. 2 while the engine is in a combustion phase. As shown by the straight dashed arrows, a combination of combustible air and gas is channeled through a combustion port 24 to the rotor combustion chamber 32 in each of the upper and lower combustion brackets 16 and 18. This combustion results in rotation (shown by the semi-circular dashed arrows) of the rotor 20. As the rotor 20 is attached to the bevel gear 28, the rotation of the rotor 20 is transmitted to the bevel gear 28, thus causing the upper and lower flywheels to be rotated.

Figure 6:
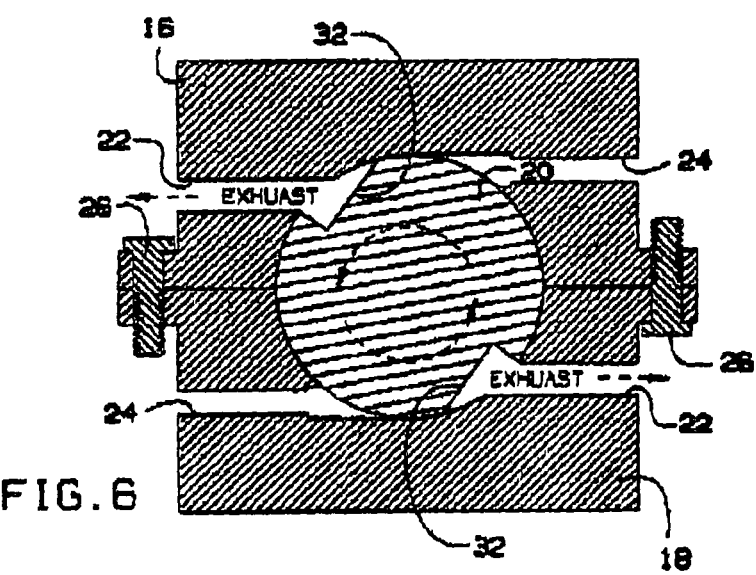
FIG. 6 conceptually illustrates a detailed sectional view of a single rotor assembly shown during an exhaust phase.

However, the combustion phase does not complete the cycle to cause movement of the flywheels for rotary engine power. In some embodiments, the exhaust from the combustion is used to complete the cycle. FIG. 6 conceptually illustrates a detailed sectional view of a single rotor assembly shown during an exhaust phase. As shown by the straight dashed arrows, resultant exhaust from the combustion described by reference to FIG. 5 is channeled out of the rotor combustion chamber 32 and through the exhaust port 22 of each combustion bracket 16 and 18. This exhaust force results in further rotation (shown by the semi-circular dashed arrows) of the rotor 20.

FIG. 3 conceptually illustrates a front view of an example balanced flywheel rotary engine of some embodiments. This figure is described by reference to FIG. 4, which conceptually illustrates an exploded view of the example balanced flywheel rotary engine. As shown, in FIG. 3, the rotor 20 of each rotor assembly 30 is rotated (shown by the dashed arrow) in the same circular direction. The result of this simultaneous rotation of the rotors is to cause the bevel gears 28 to rotate, and thereby cause the upper and lower flywheels to rotate in opposite directions.

As shown in FIG. 4, each bevel gear 28 has a geared rim 14 with a plurality of spaced grooves that fit in between the spaced grooves of the upper and lower flywheels 10 and 12. Therefore, when the rotor 20 is turned as a result of force channeled into the combustion chamber 32 through the combustion port 24 during the combustion phase and force released out of the combustion chamber 32 into the exhaust port 22 during the exhaust phase, the bevel gear 28 turns in the same way. This causes the upper flywheel 10 to move in a direction dictated by the direction of movement along the top of the geared rim 14 and the lower flywheel 12 to move in a direction dictated by the direction of the movement along the bottom of the geared rim 14. As the directions of movement along the top and bottom of the geared rim 14 are opposite, so too is the resulting movement of the upper and lower flywheels 10 and 12. In this way, the rotary engine provides perfectly balanced rotation throughout the entire combustion/exhaust power generation cycle.

In addition, perfect balance of the rotary motor is achieved due to the symmetrically opposite port openings of the top and bottom combustion brackets 16 and 18. Specifically, the combustion port 24 of the top combustion bracket 16 is on one side of the rotor 20 while the other combustion port 24 of the bottom combustion bracket 18 is on the opposite side of the rotor 20. Moreover, the rotor combustion chambers 32 are configured to simultaneously receive combustion force during the combustion phase, and simultaneously release exhaust during the exhaust phase. In this manner, each rotor assembly 30 is highly efficient at generating power for the rotary engine. Thus, all forces acting on the rotors act in concert, thus creating a perfectly symmetrical and balanced rotary motor.

In some embodiments, each rotor has an engine within itself. This results in a great power efficiency by the ability to add power. As each rotor is an engine, the power that is generated from the overall rotary engine is additive power. In other words, the amount of power increases linearly with the number of rotor assemblies added to the rotary motor. In this way, if more power is needed, more rotor assemblies can be added. Since the increase of power corresponds to a linear increase in rotors, the power produced by each rotor can be utilized as efficiently as the power generated by any other rotor. In the next section, a pistonless rotary engine is described as having a set of rotor assemblies. Each rotor assembly includes a multi-vane compressor and a combustion disk attached to the same drive shaft.

II. Rotary Engine with Multi-Vane Compressor and Combustion Disc

In some embodiments, the non-piston rotary engine comprises a pair of flywheels for generating power, a plurality of rimmed gears for applying rotary motion to the flywheels, a plurality of drive shafts that rotate the plurality of rimmed gears, and a plurality of rotor assemblies for generating mechanical energy to transfer to the rimmed gears. In some embodiments, the pair of flywheels comprises an upper flywheel and a lower flywheel. In some embodiments, the upper and lower flywheels rotate in opposite directions to balance the generated power. In some embodiments, each rimmed gear is connected to the upper and lower flywheels. In some embodiments, each rotor assembly comprises a plurality of adjustable partition vanes and a vane compressor disk that rotates within a vane compressor housing. In some embodiments, each rotor assembly further comprises a combustion disk and a plurality of combustion disk chambers for igniting combustible gas and expelling exhaust fumes created after combustion.

Figure 7:
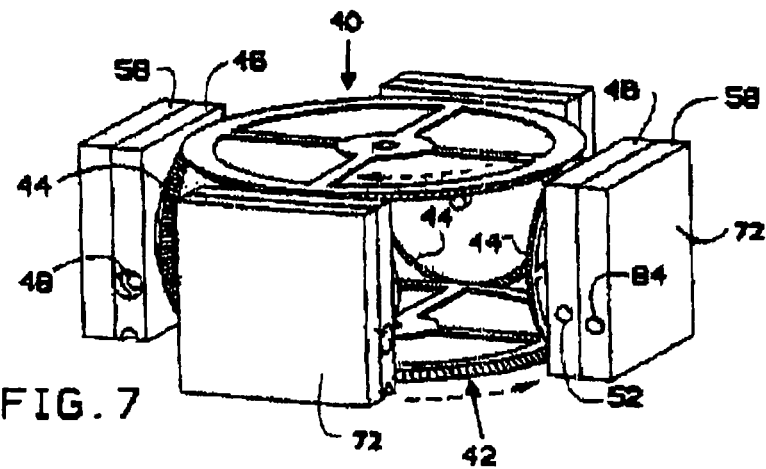
FIG. 7 conceptually illustrates a perspective view of multi-vane compressors and combustion disks used in a balanced flywheel rotary engine in some embodiments.

FIG. 7 conceptually illustrates a perspective view of multi-vane compressors and combustion disks used in a balanced flywheel rotary engine in some embodiments. Specifically, this figure is similar to FIG. 1, showing a number of components of the balanced flywheel rotary engine, including an upper flywheel 40, a lower flywheel 42, and a set of four geared rims 44. Each geared rim 44 is connected to a rotor assembly which includes a combustion housing 46 comprising a spark plug chamber 48 and an exhaust port 52, and a vane housing 58 having a vane hole 84.

In some embodiments, the rotary assemblies are individual motors that are positioned between the top and bottom flywheels. In some embodiments, the rotary motors all fire at the same time. When the rotary motors are firing simultaneously, resulting combustion turns the upper flywheel 40 in one direction and the lower flywheel 42 in the opposite direction (i.e., as shown by the dashed arrows). The opposing direction the flywheels are moving in results in smooth centrifugal force that is perfectly balanced. Thus, because the flywheels and the rotary assemblies work in synch, the engine operates in a perfectly balanced state in these embodiments.

In some embodiments, the combustion disk 54 within the combustion housing 46 includes two combustion chambers 56. This disk 54 rotates within the combustion housing 46, which seals the combustion chambers 56 against the combustion housing cylindrical wall. As the disk rotates, the combustion chamber 56 aligns with the spark plug at the spark plug chamber 48 for ignition. Then the combustion chamber 56 moves on to the exhaust portion of the combustion disc's cycle. In some embodiments, a portion of the cylindrical wall within the combustion housing 46 is lined with one or more openings leading to the exhaust pipe (i.e., the final exhaust port 52). The openings are in some embodiments include one or more of a set of holes and a set of slots. In some embodiments, the portion of the cylindrical wall that is lined with the openings is at least half of the cylindrical wall. In some embodiments, the exhaust port 52 is where the combusted gas will escape the combustion chamber 56. The combusted gas molecules are more massive than any un-burnt air left in the chamber. So as the disk rotates, the combusted gas molecules will move away from the axis of rotation toward the outside of the combustion chamber 56 (i.e., through the holes and/or slots lining the cylindrical wall of the combustion housing) and eventually out the exhaust port 52.

In some embodiments, the rotary vane compressor in the vane housing 58 comprises a core element mounted on a shaft 80. The core element of some embodiments is a vane compressor disk 62 comprising a plurality grooves into which a plurality of sliding blades 60 are fit. Centrifugal forces caused by the rotation of the vane compressor disk 62 keep the blades 60 extended out of the longitudinal grooves of the vane disk 62 and in constant contact with the interior vane housing 58 wall. Such bladed disk rotation is consistent with the four stroke cycle. For instance, the blade starts its compression cycle at the beginning of the intake port 50, where the tip is flush with the edge of the vane disk 62. As the vane disk 62 rotates, the blade slides out of groove and the disk edge is offset from the housing edge. The blade 60 then extends to create a barrier that the fresh fuel mixture cannot escape. As the vane disk 62 rotates, the blades 60 push the air that is in front of it forward. Once the blade 60 passes the intake port 50, the volume is sealed and steadily decreased as the distance between the disk and the housing decrease. The fuel mixture is compressed until it reaches the port that exits into the combustion chamber.

Figure 8:
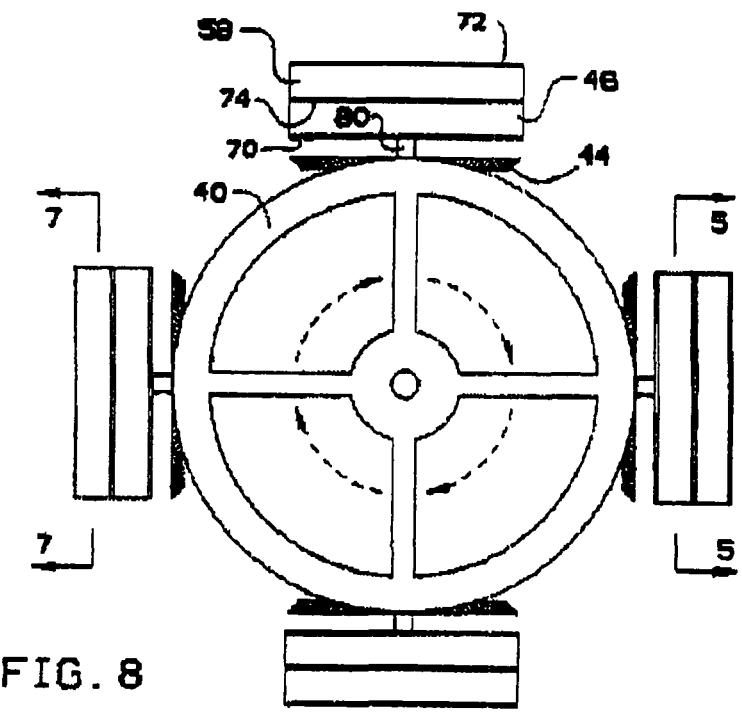
FIG. 8 conceptually illustrates a top view of multi-vane compressors and combustion disks used in a balanced flywheel rotary engine in some embodiments.

FIG. 8 conceptually illustrates a top view of multi-vane compressors and combustion disks used in a balanced flywheel rotary engine in some embodiments. This figure is described by reference to FIG. 9, which illustrates a front view of the multi-vane compressors and combustion disks used in the rotary engine shown in FIG. 8. This figure is also described by reference to FIGS. 11 and 12, which illustrate a vane compressor disk during a compression stroke stage of the Otto-cycle, and by reference to FIGS. 13 and 14, which illustrate a combustion disk during a combustion stroke stage of the Otto-cycle. As shown in FIG. 2, the upper flywheel 40 is rotating in a particular direction (shown by the dashed arrows). In some embodiments, each of the rimmed gears 44 moves according to the mechanical rotating motion of the corresponding drive shaft 80. The mechanical motion of the drive shaft is a result of the power generated by the corresponding rotor assembly. As the rimmed gears 44 rotate, the upper flywheel 40 is caused to rotate accordingly. Although not shown in FIG. 8, an opposite movement of the lower flywheel 42 is caused by rotation of the rimmed gears 44 in some embodiments.

Figure 9:
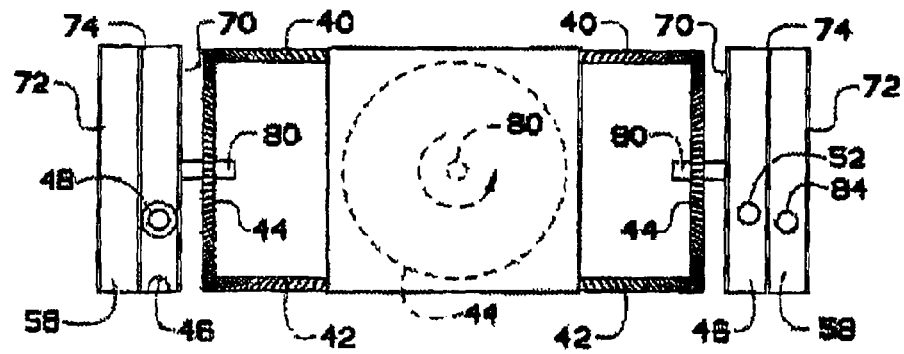
FIG. 9 conceptually illustrates a front view of multi-vane compressors and combustion disks used in a balanced flywheel rotary engine in some embodiments.

FIG. 9 conceptually illustrates a front view of multi-vane compressors and combustion disks used in a balanced flywheel rotary engine in some embodiments. As shown, the rotary engine includes a pair of rotor assemblies that each include a vane housing 58 and a combustion housing 46 separated by a middle plate 74. A vane housing plate end-cap 72 covers the outer side of the vane housing 58 and a combustion housing plate end-cap 70 covers the inner side of the combustion housing 46. The combustion housing 46 includes an initial exhaust port, a spark plug chamber 48 (as shown on the left-side combustion housing 46), and a final exhaust port 52 (as shown on the right-side combustion housing 46). The vane housing 58 includes a vane hole 84 (as shown on the right-side vane housing 58).

A drive shaft 80 for each rotor assembly connects the corresponding combustion housing 46 and vane housing 58 to a corresponding geared rim 44. The geared rim 44 is in contact with an upper flywheel 40 and a lower flywheel 42. As shown in dashed line, the front geared rim 44 rotates (as shown by the dashed arrow) according to the rotation of the drive shaft 80. The rotation in the engine is based on the power generated from the rotor assemblies. The operations performed in generating the power are described by reference to FIGS. 11-14.

Figure 11:
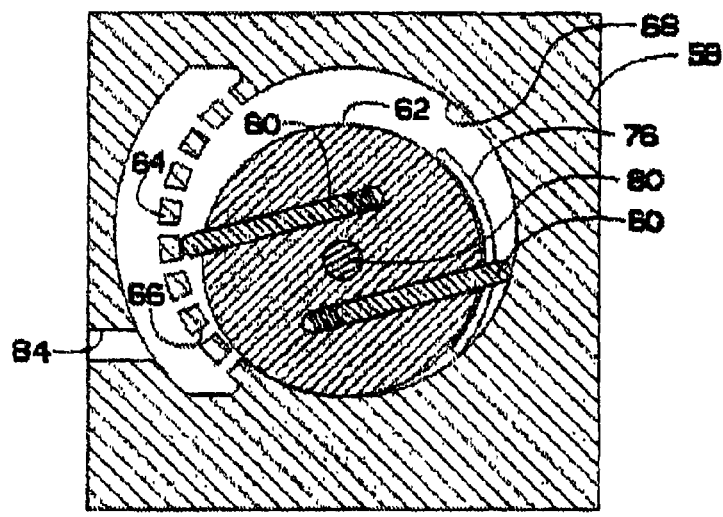
FIGS. 11 and 12 conceptually illustrate detailed sectional views of a vane compressor disk in a vane housing of a single rotor assembly along line 7-7 of the rotary engine shown in FIG. 8, as the vane compressor disk takes in and compresses a mixture of air and gas while rotating to move the gas mixture to the spark plug in the combustion chamber for ignition.
Figure 12:
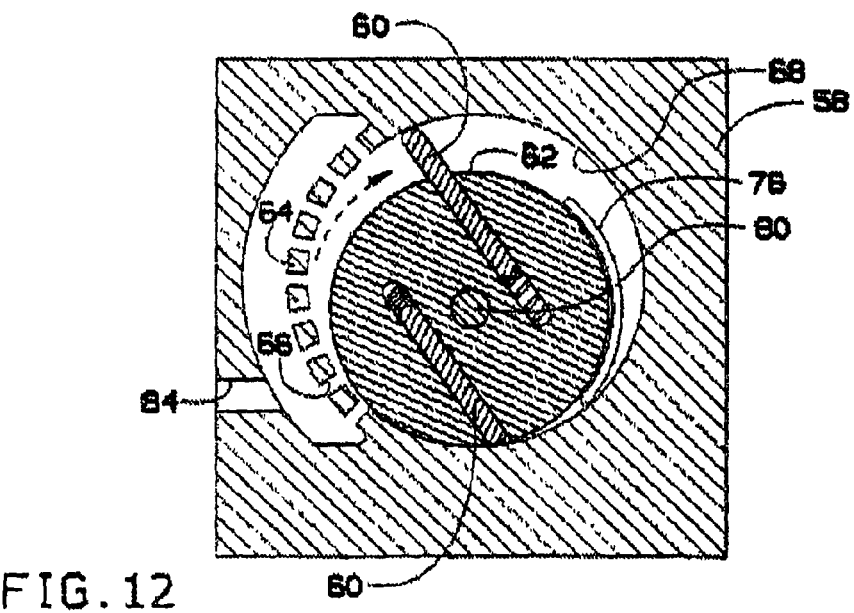

FIGS. 11 and 12 conceptually illustrate detailed sectional views of a vane compressor disk in a vane housing of a single rotor assembly along line 7-7 of the rotary engine shown in FIG. 8, as the vane compressor disk takes in and compresses a mixture of air and gas while rotating to move the gas mixture to the spark plug in the combustion chamber for ignition.

Specifically, these figures show a vane housing 58 with a cut-out rotation chamber that includes a rotating vane disk 62 attached to a drive shaft 80. The vane disk includes a pair of vanes 60 within a pair of grooves in the disk 62. The bottom of each groove includes a spring 78 that allows the vanes 60 to partially move in and out of the grove. An inner vane slide surface 68 contains the disk 62 and vanes 60. A vane hole 84 provides ingress for the air and gas mixture and a perforated wall 64 with several perforations 66 allows a mixture of air and gas to enter the rotation chamber of the vane disk 62. A middle plate slot 76 provides egress of compressed gas to the corresponding combustion housing 46 of the rotor assembly.

The proposed design solution assumes that the necessary air-fuel mixture mass-ratio of 20.03 is achieved outside of the designed intake portion of the engine by means of a carburetor. After this air-fuel mixture is ready, it is sucked into the multi-vane compressor through the vane hole 84. As the multi-vane compressor disk 62 spins, half of the rotation has an expanding volume between the compressor vanes 60. The expanding volume creates a siphon which draws in the air-fuel mixture. After the mixture enters the housing though the intake vane port 84, it enters the vane compressor chamber through the perforated wall 64, which includes an array of intake openings separated by the perforations 66. This array of intake openings can be an array of holes or an array of slots that is placed on the inner perforated wall 64 of the vane housing 58 over the circumferential distance where the compressor volume is increasing. As soon as the vane compressor disk 62 rotates to a position where the volume between vanes 60 begins to decrease, the array of intake opening is no longer able to supply any more air and fuel to the system because one of the vanes 60 seals off the decreasing volume from the intake portion.

As the compressor disk 62 spins and the vanes 60 decrease the intake volume (shown by the dashed arrow), this volume begins to be pushed through the curved middle plate slot 76. The middle plate of some embodiments divides the vane housing 58 from the combustion housing 46. This curved slot 76 is in alignment with a corresponding port along the side of the combustion chambers of the combustion disk that spins within the combustion housing 46. Since the vane compression disk 62 and the combustion disk are attached to the same drive shaft 80, they spin at the same rate. This means that every time the compressor begins to compress the intake volume, a combustion chamber intake port aligns with the curved slot 76 in the divider plate, connecting the decreasing compressor volume to the combustion chamber volume. As the vane compressor disk 62 rotates and decreases the volume, the air-fuel mixture present in between the blades of the compressor is transferred to the combustion housing 46.

It is assumed that the air-fuel mixture through sucked into the vane housing 58 through the vane hole 84 is at approximately atmospheric conditions (e.g., 14.7 psi and 70° F.). In practice near the start-up of this engine, the compressor in some embodiments can reach a conservative estimate for compression in the combustion chamber of about 50 psi, which will bring the air-fuel mixture to about 306° F. At this conservative estimate, the compression ratio for this engine is 2.4. However, after the multi-vane compressors get up to speed and start compressing at maximum capacity, the ratio can be different. In some embodiments, a maximum pressure is known for the multi-vane compressor (i.e., a maximum pressure of around 81 psi).

Once all the decreasing air-fuel mixture compressor volume has been transferred into the combustion housing 46 chamber through rotation of the vane disk 62 and the corresponding vanes 60, the curved middle plate slot 76 no longer aligns with the combustion chamber intake port. When this happens, the combustion chamber is not connected with the changing volume of the multi-vane compressor, but is completely sealed and contains the pressurized air and gas mixture.

In some embodiments, the combustion disk 54 within the combustion housing 46 includes two combustion chambers 56. This disk 54 rotates within the combustion housing 46, which seals the combustion chambers 56 against the combustion housing cylindrical wall. As the disk rotates, the combustion chamber 56 aligns with the spark plug at the spark plug chamber 48 for ignition. Then the combustion chamber 56 moves on to the exhaust portion of the combustion disc's cycle. In some embodiments, a portion of the cylindrical wall within the combustion housing 46 is lined with several openings leading to the exhaust pipe (i.e., final exhaust port 52). These openings include at least one of a set of slots and a set of holes. In some embodiments, the portion of the cylindrical wall that is lined with the openings is at least half of the cylindrical wall. In some embodiments, the exhaust port 52 is where the combusted gas will escape the combustion chamber 56. The combusted gas molecules are more massive than any un-burnt air left in the chamber. So as the disk rotates, the combusted gas molecules will move away from the axis of rotation toward the outside of the combustion chamber 56 and eventually out the exhaust port 52.

Figure 13:
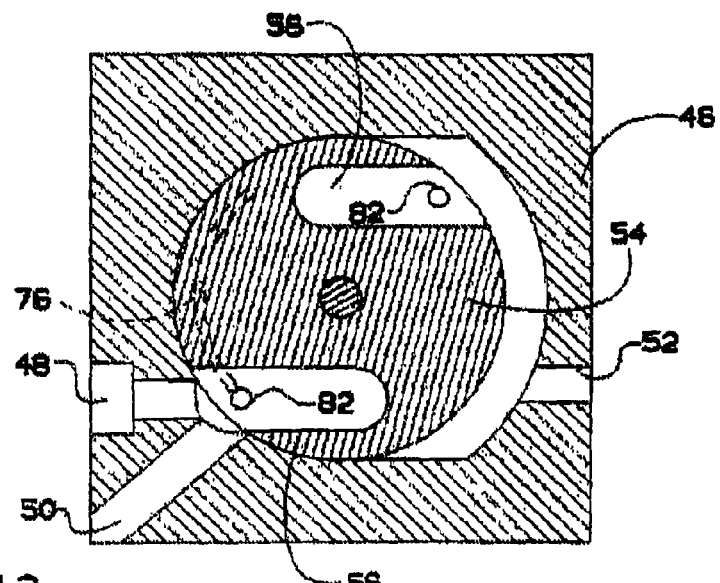
FIGS. 13 and 14 conceptually illustrate detailed sectional views of a combustion disk in a combustion housing of a single rotor assembly along line 5-5 of the rotary engine shown in FIG. 8, as the combustion disk moves a mixture of air and gas in the combustion chambers to ignition and exhaust.
Figure 14:
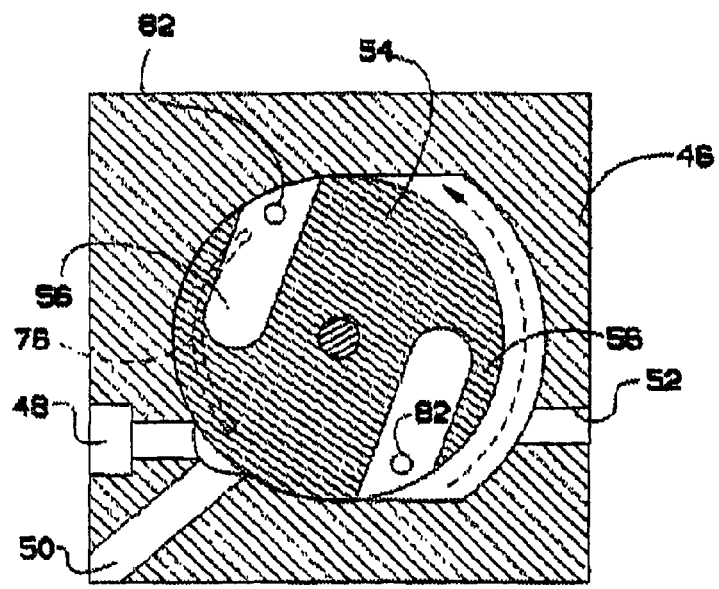

FIGS. 13 and 14 conceptually illustrate detailed sectional views of the combustion disk in the combustion housing of the single rotor assembly along line 5-5 of the rotary engine shown in FIG. 8, as the combustion disk moves a mixture of air and gas in the combustion chambers to ignition and exhaust.

Specifically, these figures show the middle plate slot 76 behind the combustion disk 54. The combustion disk 54 includes two combustion chambers 56 that each include a combustion disk chamber hole 82 that lines up with the middle plate slot 78. The combustion housing 46 also includes a spark plug chamber 48, an initial exhaust port 50, and a final exhaust port 52.

Almost immediately after the combustion chamber is sealed, it reaches its ignition position, where the spark plug is located along the combustion disk housing 46. The outer surface of the combustion disk and the inner wall of the combustion housing 46 create a seal that prevents transfer of any gases or fluids. This means that when the compressed air-fuel mixture in the combustion chamber 56 is ignited, the high pressure and temperature gases have nowhere to go until the initial exhaust valve 50 is opened.

Although different embodiments can practice efficient power generated at different temperatures and pressures, in some embodiments, when the air-fuel mixture is at a particularly suitable pressure and temperature in the combustion chamber 56 before ignition, the mixture will reach a particular pressure and temperature based on the flame temperatures of the air and gas. For instance, the air-fuel mixture may reach a suitable pressure of 50 psi and temperature of 306° F. in the combustion chamber 56 before ignition, and later, the mixture would reach a pressure of 240 psi and a temperature of 3,214° F. after combustion, when based on the adiabatic flame temperature of a gasoline (e.g., octane) and air (e.g., oxygen and nitrogen) mixture. Immediately after the combustion of the air-gas mixture in the combustion chamber 56, an initial exhaust port 50 valve located alongside the spark plug chamber 48 opens to release the high pressure and high temperature combusted gas. This valve can be operated either electronically in the same way that the spark plug is, or it can be mechanically driven by activating at a certain point in the drive shaft rotation. The combusted gases exhausted through this exhaust port 50 can be treated similar to the nozzle of an air-standard jet propulsion cycle because the power is derived from the force that the exhausted gas puts on the system. The velocity of the exhaust gases, for example, can typically be calculated at 106 mph. This high velocity gas is what propels the combustion disk 54 around its rotation. The initial exhaust port 50 in some embodiments is in alignment with the combustion disk 54 so that a suitable amount of power is provided to propel the disk 54. For example, the alignment can be through 28.4° of disk rotation. Thus, the disk 54 is only powered by the exhausting gas through that angular distance. The combustion chamber 56 then seals off again against the combustion housing 46 wall until it rotates to the final exhaust portion of the disk rotation.

The final exhaust portion of the combustion disk 54 rotation consists of an open space in the combustion disk housing 46 where there is no inner housing wall in contact with the outer disk surface. The combusted gaseous molecules remaining in the combustion chamber 56 after initial exhaust port 50 exhaust are heavier than "clean" air, so they are drawn away from the axis of disk rotation toward the open secondary exhaust volume, leaving mainly "clean" air in the combustion chamber 56. As shown in the drawings, there are two combustion chambers 56 within the combustion disk 54. In this configuration, one chamber 56 is rotating through the secondary exhaust potion of its rotation, the other chamber 56 is receiving the pressurized air-fuel mixture from the multi-vane compressor. The combustion disk 54 continues to rotate until the combustion chamber 56 once again seals with the combustion disk housing 48 inner wall as the secondary exhaust portion of the cycle ends. This combustion chamber 56 then rotates to a position where it aligns again with the curved slot 76 in the middle divider plate and receives the pressurized air-fuel mixture through the combustion chamber port 82 from the multi-vane compressor. The cycle then repeats, with one chamber being pressurized and ignited while the other chamber is exhausting gases.

In some embodiments, the engine runs on a combination of two thermodynamic processes, the intake, compression, and combustion steps follow a standard Otto cycle while the valved exhaust is modeled after an air-standard jet propulsion cycle. By going through the thermodynamic analysis of the compression and the combustion steps, the thermodynamic efficiency can be substantial. For instance, the efficiency is typically calculated to be approximately 29%, which is about the same efficiency that standard internal combustion engines reach. Furthermore, in some embodiments, the mechanical efficiency of the engine results in gains over the standard internal combustion engine, because this engine conserves momentum more effectively through rotary motion. In some embodiments, when four of the rotary assembly engines are placed around upper and lower large flywheels, the entire system will keep running without requiring much additional input once up to speed. For example, one combustion chamber firing at the conservative 50 psi compression value was calculated to produce 0.003 horsepower.

Furthermore, in some embodiments, larger flywheels are used in a rotary engine to meet greater power needs. As the power generation is scalable by both the size of the flywheels used and the number of rotors employed, the rotary engine of some embodiments is designed to generate power for very large machines or dispersed power distribution. Examples of very large machines include commercial buildings, homes, ships, watercraft, semi-trucks, construction machinery, etc. Examples of dispersed power distribution having large power needs includes corporate campuses, universities and colleges, towns, cities, and other municipalities.

In some embodiments, the combustion and compressor housings, the combustion disk, and the vane compressor disk are made of aluminum. This allows a light-weight build for the engine and also makes those parts easier to manufacture. The divider plate and compressor vanes of some embodiments are manufactured from steel sheets. These are routinely sold at lower thicknesses than can be found in other materials. The drive shaft and key stock of some embodiments are made of steel, as well as the small springs attached to the compressor vanes at the bottom of the grooves (i.e., the springs that keep the vanes in contact with the housing wall).

Figure 10:
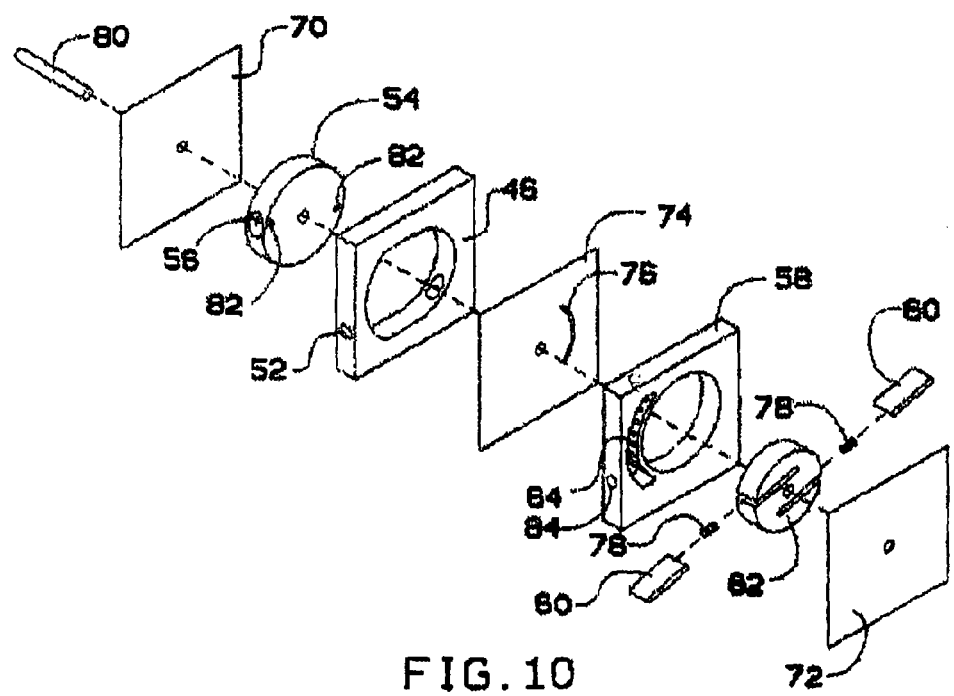
FIG. 10 conceptually illustrates an exploded view of an example balanced flywheel rotary engine that generates power from multi-vane compressors and combustion disks.

In other embodiments, the selected materials are more stringent. FIG. 10 conceptually illustrates an exploded view of an example balanced flywheel rotary engine that generates power from multi-vane compressors and combustion disks. Here, just the vanes used in the rotary vane compressor made of a composite with resin reinforcement similar to those used in large industrial compressors. Vanes can be made of carbon fiber with different coatings to ensure a good seal against the compressor wall as well as minimal deformation at speed. The housings for this engine would likely need to be made of high-pressure cast aluminum to ensure even density throughout the housing walls. The housings would then need to be treated at surfaces where components will be in moving contact, such as the inner walls of the housings. The same applies for the divider plate and end-plates which will also need to have treated surfaces with a fine surface finish to create viable sealing. With every material used in piston-less rotary engines, the surface treating and finish is crucial to the long-term success of the engine because of the many moving surfaces that need to be sealed. After the engine runs for a set amount of time, the surface treatment and sealing will be even more important due to any thermal expansion that the components will endure. Thermal expansion is one reason that ceramic components may be a viable solution in this rotary engine, because ceramic or metal-ceramic composites experience minimal deformation due to thermal effects.

This engine could be used for a wide variety of applications and some of these applications. While this engine may be able to achieve higher mechanical efficiency than current engines, it still runs on standard fuels and still has an impact on the environment through CO2 emissions. This engine can be used in the automotive industry to produce vehicles that would get more miles to the gallon. Applying this engine to other markets is possible too, such as ships, large locomotives, and machines.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims

I claim:

1. A non-piston rotary engine comprising:
a first flywheel and a second flywheel;
a plurality of motors, where each motor of the plurality of motors comprising:
a rotating combustion disk including at least two recesses symmetrically disposed about the circumference of the rotating combustion disk;
a housing surrounding the rotating combustion disk to define at least one combustion chamber,
the housing further including at least one combustion port and at least one exhaust port, wherein combustible gas forced through the at least one combustion port into the at least one combustion chamber is combusted, causing the rotating combustion disk to rotate in a direction to release exhaust from the combustion through the at least one exhaust port; and
a gear connected to the rotating combustion disk;
wherein the gear of each of the plurality of motors engages both the first flywheel and the second flywheel such that movement of the rotating combustion disk of each of the plurality of motors causes the respective gear to rotate the first flywheel in an opposite direction from the second flywheel in order to balance power between the first flywheel and the second flywheel.

2. The non-piston rotary engine of claim 1, wherein the gear of each one of the plurality of motors is a bevel gear comprising a gear rim.

3. The non-piston rotary engine of claim 1, wherein the first flywheel and the second flywheel comprises an upper flywheel and a lower flywheel.

4. The non-piston rotary engine of claim 1, wherein the housing comprises an upper combustion bracket and a lower combustion bracket.

5. The non-piston rotary engine of claim 4, wherein the upper combustion bracket and the lower combustion bracket are connected by a pair of bolts.

6. The non-piston rotary engine of claim 4, wherein the upper combustion bracket and the lower combustion bracket of each of the plurality of motors comprises a combustion channel through which the combustion chamber receives combustible gas and an exhaust channel into which the combustion chamber releases exhaust.

7. The non-piston rotary engine of claim 4, wherein the combustion channel and the exhaust channel are on opposite sides of the upper combustion bracket and the lower combustion bracket.

8. The non-piston rotary engine of claim 6, wherein the combustion channel of the upper combustion bracket is on a first side of the upper combustion bracket and the combustion channel of the lower combustion bracket is on a second side of the lower combustion bracket that is the opposite side of the first side of the upper combustion bracket.

9. The non-piston rotary engine of claim 6, wherein the exhaust channel of the upper combustion bracket is on a second side of the upper combustion bracket and the exhaust channel of the lower combustion bracket is on a first side of the lower combustion bracket that is the opposite side of the second side of the upper combustion bracket.

10. The non-piston rotary engine of claim 1, wherein the number of the plurality of motors can be increased to increase the amount of power generated by the non-piston rotary engine.

11. A non-piston rotary engine that generates power using a multi-vane compressor, said non-piston rotary engine comprising:
- an upper flywheel and a lower flywheel that rotate in opposite directions to balance the power received from a plurality of motor assemblies;
- each motor assembly of the plurality of motor assemblies comprising:
  - (i) the multi-vane compressor comprising a vane compressor housing, a rotating vane compressor disk, and a plurality of adjustable partition vanes for taking in and compressing combustible gas, and
  - (ii) a combustion housing comprising a rotating combustion disk and a plurality of combustion disk chambers symmetrically disposed about a circumference of the rotating combustion disk for igniting the compressed combustible gas from the multi-vane compressor and expelling exhaust fumes created after combustion, wherein compressed combustible gas forced into the plurality of combustion disk chambers is combusted, causing the rotating combustion disk to rotate in a direction to release exhaust from the combustion disk chamber and generate rotational energy;
- wherein each motor assembly further includes a drive shaft that is connected to the rotating combustion disk and a geared rim; and
- each of the geared rims is engaged with both the upper flywheel and the lower flywheel, so that the rotational energy is transferred from each of the plurality of motor assemblies to the upper flywheel and the lower flywheel.

12. The non-piston rotary engine of claim 11, wherein the combustion housing comprises a spark plug chamber for igniting the compressed combustible gas and a set of exhaust ports for expelling the exhaust fumes.

13. The non-piston rotary engine of claim 12, wherein the set of exhaust ports comprises an initial exhaust port adjacent to the spark plug chamber and final exhaust port in a sealed volume chamber opposite the spark plug chamber.

14. The non-piston rotary engine of claim 12, wherein the rotating combustion disk in the combustion housing rotates the combustible gas to the spark plug chamber for combustion and for rotating the combusted gas to the set of exhaust ports.

15. The non-piston rotary engine of claim 11, wherein the vane compressor housing and the combustion housing are separated by a middle plate.

16. The non-piston rotary engine of claim 15, wherein the middle plate comprises a curved slot configured to allow the compressed combustable gas from the vane compressor housing to move into the combustion housing.

17. The non-piston rotary engine of claim 11, wherein the vane compressor housing comprises a plurality of perforations along a perforated wall that allows gas to be sucked into an expanding volume created as the rotating vane compressor disk rotates.

18. The non-piston rotary engine of claim 17, wherein the adjustable partition vanes adjust when the vane compressor disk rotates.

19. The non-piston rotary engine of claim 18, wherein the adjustable partition vanes maintain contact with an inner surface of the vane compressor housing to seal off the volume of the compressed combustable gas as the vane compressor disk rotates.

* * * * *